(12) United States Patent
Julia

(10) Patent No.: US 6,311,961 B1
(45) Date of Patent: Nov. 6, 2001

(54) HYDRO-PNEUMATIC SUSPENSION UNIT FOR LAND-VEHICLES

(76) Inventor: Silvestre Edigio Julia, Catamarca 1434, Mardel Plata, Buenos Aires (AR)

( * ) Notice: Subject to any disclaimer, the term of this patent is extended or adjusted under 35 U.S.C. 154(b) by 0 days.

(21) Appl. No.: 09/162,202

(22) Filed: Sep. 28, 1998

Related U.S. Application Data (63) Continuation-in-part of application No. 08/794,966, filed on Feb. 3, 1997, now abandoned.

(30) Foreign Application Priority Data

Mar. 22, 1996 (AR) .................................................... 335856

(51) Int. Cl.⁷ .................................................... B60G 17/00
(52) U.S. Cl. .................................. 267/64.17; 188/322.13; 188/322.15; 188/313
(58) Field of Search ................. 267/64.17, 64.15, 267/64.11, 64.23, 64.28, 120–129, 139, 140; 188/322.13, 322.14, 322.19, 269, 315, 298, 314, 266.1, 317, 312, 313

(56) References Cited

U.S. PATENT DOCUMENTS

| | | | | |
|---|---|---|---|---|
| 3,762,514 | * | 10/1973 | Freitag | 188/314 X |
| 3,801,087 | * | 4/1974 | Akaike et al. | 267/139 |
| 3,817,566 | * | 6/1974 | Keijzer et al. | 367/64.11 X |
| 4,506,869 | * | 3/1985 | Masclet et al. | 267/64.15 |

\* cited by examiner

*Primary Examiner*—Robert J. Oberleitner
*Assistant Examiner*—Melanie Torres
(74) *Attorney, Agent, or Firm*—F. David AuBuchon; Brinks Hofer Gilson & Lione (57) ABSTRACT

A suspension unit for mounting an axle to the body of an automobile or a handle-bar to the fork of a bicycle or motorcycle. A pair of pistons (15, 29) operate in tandem in separate chambers (17, 31) having a compressible gas in spaces (21, 35) on one side of the piston and an uncompressible hydraulic fluid in spaces (19, 31) on the other side of the piston. One of the pistons (15) responds to external disturbances (caused by e.g. road bumps) to drive the other piston (29) against the compressible gas which responds resiliently to return the pistons to normal intermediate placements, thereby maintaining or recovering proper height of the automobile or'cycle parts. The hydraulic fluid spaces are communicated via constrictor passage to provide suitable dynamic dampening. Embodiments are disclosed wherein the tandem coupling of the pistons is either hydraulic or else mechanical; wherein the chambers may be provided in separate housings or the gas spaces coupled to separate containers for reducing the overall height of the unit; wherein a precharger valve may be used to regulate the vehicle height and wherein some passages are selectively one-way or, additionally, are provided with orifice adjustment means for providing assymetrical and/or variable dampening factors.

28 Claims, 4 Drawing Sheets

HYDRO-PNEUMATIC SUSPENSION UNIT FOR LAND-VEHICLES

CROSS-REFERENCE TO RELATED APPLICATION

The present application is a continuation-in-part of my application Ser. No. 08/794,966 filed Feb. 4, 1997 and abandoned on Sept.28, 1998.

FIELD OF THE INVENTION

The present invention refers to a hydro-pneumatic suspension unit, in particular to a device providing both spring and shock-absorber functions. The present invention is useful for enabling a machine part subjected to shocks, bumps, jerks or displacements to substantially maintain or recover its original, or balanced, position, providing a swift and smooth response to external mechanical disturbances.

The shock-absorber function, within the context of the present invention, is related to dampening movement transmitted from a movable part to another part supported thereon or otherwise connected thereto. Likewise, the function of the spring is to maintain support of the movable part at a predetermined height or distance from the other part, by resiliently urging the movable part back to its original placement once the external force causing movement thereof has ceased.

Although the ensuing description generally refers to applications involving land vehicles, more particularly automobiles, the present invention may be used in or adapted to other applications, encompassing other forms of locomotion, such as bicycles or motorcycles for instance, and support means for vibrating, revolving and/or reciprocating industrial or domestic machine parts. In the automobile application, the unit of the invention has been designed to replace all springs and/or torsion bars and shock absorbers in axle suspension units.

BACKGROUND OF THE INVENTION

U.S. Pat. No. 3,762,514 to Freitag (issued October, 1973) discloses an adjustable-length support column designed for a vehicle seat to reduce resiliency under overload condicitons, such as in the event of a vehicle collision. The column includes a piston for attachment to a movable part and a floating piston mounted in separate parts of a cavity divided by a fixed wall. The wall has a normally-open throttle valve designed to close when the hydraulic pressure in the first piston cavity part suddenly increases, thereby substantially reducing column resiliency under collision conditions. The floating piston rests on an pneumatic cushion and the first piston includes a longitudinal through bore which respectively provide resiliency and shock-absorbing effects.

However, the Freitag unit may not be mounted alone for a vehicle suspension unit, that is it would require a spring, for example, to maintain the proper height of the part requiring support. Otherwise, unrestricted flow of the hydraulic fluid through the first piston bore would lead to the piston dropping down and coming to rest on the fixed wall.

U.S. Pat. No. 3,817,566 to Keijzer et al (issued June, 1974) discloses an energy absorber wherein a three-position valve assembly is deformed by fluid pressure developed when an external force acts on a piston. A resulting substantial valve deformation enables gas to pass therethrough thereby pressurizing a housing. Once impact is over, the gas bleeds back through the now less-deformed valve to restore the bumper to its original position. The Keijzer device is suited for vehicle bumpers and the like for absorbing energy generated by collisions under about 16 km/h (10 mph).

U.S. Pat. No. 4,506,869 to Masclet et al (issued March, 1985) discloses an aircraft hydro-pneumatic shock absorber having a hydraulic chamber containing a piston and a fixed partition wall. The piston is provided with a fairly large orifice freely communicating oil from said chamber to a second chamber integral with the piston and containing partly oil and partly air, the latter providing a known predetermined spring function. The wall has a constriction valve and across the wall from the piston there is provided a floating piston separating the oil from a pneumatic chamber, thereby providing a second spring function. The latter function may be varied by means of a computer-controlled movable head in the pneumatic chamber, which has the effect of lengthening and shortening the shock absorber, thereby providing an electronically variable force-plunging function for specifically adapting to different aircraft load conditions and take-off and landing absorber roles.

The Masclet unit would require constantly monitoring for hydraulic fluid leakages, since an eventual loss of oil would also render the pneumatic part unoperative Other known references in the field comprise the following U.S. Patents:
U.S. Pat. No. 2,410,176 (Magnum)
U.S. Pat. No. 3,801,087 (Akaike et al)
U.S. Pat. No. 3,865,356 (Wüssner)
U.S. Pat. No. 4,423,801 (Miura)
U.S. Pat. No. 4,687,187 (Bellapadrona)
U.S. Pat. No. 4,795,009 (Tanahashi et al)
U.S. Pat. No. 4,821,983 (Aubry et al)
U.S. Pat. No. 5,330,132 (Lucienne et al)

The disclosures of the above-mentioned U.S. patents are hereby incorporated herein by reference.

SUMMARY OF THE INVENTION

Therefore, an object of the present invention is to provide a suspension unit for supporting a first part on a second part, said parts being movable relative to one another, without the need of additional springs, torsion bars or shock absorber units.

Another object is a suspension unit which is relatively simple to adjust to desired operating conditions from the outside, without having to dismount nor disassemble the unit.

A further object is a suspension unit for mounting in land vehicles for providing smoother travelling conditions, increased tracking (i.e. road surface contact) through curves, better stability during sudden acceleration and braking, greater engine efficiency, increased vehicle load capacity and factory adaptability to a wide range of vehicle kinds, particularly insofar the desired mounting height or distance between the two vehicle parts (e.g. axle and chassis) to be connected by the unit.

These and other objects and advantages, which may become apparent in the course of the ensuing description, are achieved by means of a dual-chamber suspension unit according to the present invention. The unit comprises: stationary housings respectively defining a first chamber and a second chamber therein; a first piston slidably mounted in the first chamber and defining therein a first space adjacent the piston for an uncompressible fluid and a second piston slidably mounted in the second chamber and defining therein a second space for the uncompressible fluid adjacent the second piston; restricted passage means for communicating fluid back and forth between the first and second spaces in response to sliding movement of the first piston in the first chamber, whereby movement externally applied to the first piston causes the uncompressible fluid to flow from one space to the other the space through the passage means and further causing displacement of the second piston in the second chamber; and resilient means, most preferably comprising a third space for a compressible fluid in the second chamber across the second piston from the second space, for biasing the second piston means in an intermediate placement in the second chamber generally corresponding to a normal placement of the first piston in the first chamber. Following such a displacement, the compressed fluid in the third space urges the second piston back to its placement which, in turn, urges the first piston back to its normal placement in the first chamber, thereby realizing a spring function for maintaining a predetermined distance between the movable parts, whereas the restricted passage means dampens the movement of the pistons, the unit of the invention thereby providing combined spring and shock-absorber functions.

In a first embodiment, the first and second housings are affixed to each another forming a common structure such that the first and second chambers are coaxially aligned. Preferably, a longitudinally-stiff rod mechanically connects both pistons so that they displace in tandem together. The rod may continue its extension through the first piston to an end adapted for anchorage of the suspension unit.

In a second embodiment, the second piston is a floating piston, such that displacement thereof is caused by fluid pressure increasing in the second space in response to an inflow of uncompressible fluid from the first space through the passage means. In a third embodiment, the first and second housings may comprise separate structures and the passage means comprises tubing means extending therebetween. The housings may be mounted side-by-side for shortening the actual physical height of the suspension unit without cutting back on the operative length.

Additionally, the second housing may be provided with a respective valve for injecting or extracting compressible fluid into the third space, for adjusting the normal placements of the pistons to alter suspension response of the unit or for connecting to an extra chamber for altering suspension response of the unit. A fourth space similarly defined in the first chamber may also include a valve for connection to an outside container for the compressible fluid.

The unit of the invention may be designed for automobiles as suspension systems isolating the automobile body from bumps on the road picked up by the wheels, as well as for bicycles and motorcycles. In a bicycle or motorcycle, the suspension system may be housed inside the tubular structure which supports the handlebar on the fork.

In 'cycle applications particularly, means may be provided for both variable and differential dampening factors during unit expansion and compression strokes.

The invention also encompasses a method for providing suspension between two parts movably mounted to one another at a predetermined distance by means of the suspension units.

BRIEF DESCRIPTION OF THE DRAWINGS

These and other features, advantages and details of this invention and how it may be reduced to practice may be better understood from the ensuing detailed description, by way of example and by no means limiting, of exemplary embodiments represented in the appended drawings, wherein.

DETAILED DESCRIPTION OF PREFERRED EMBODIMENTS

Figure 1:
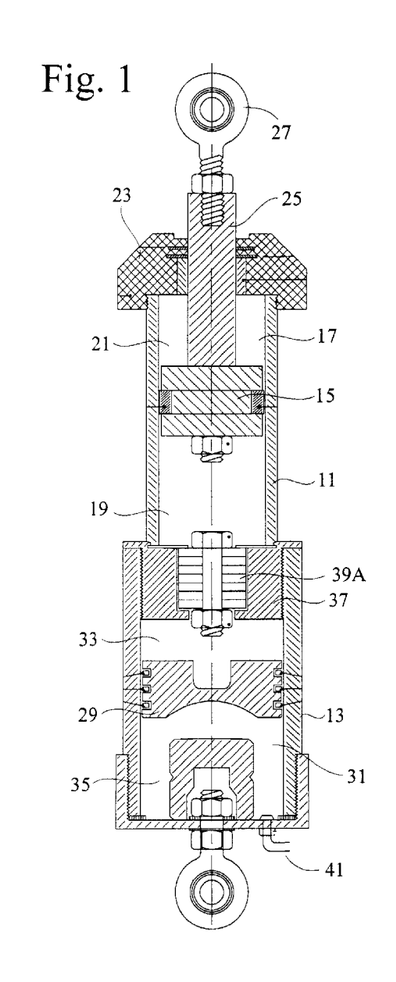
FIG. 1 is a cross-section schematic of a suspension unit according to a first embodiment of this invention.
Figure 2:
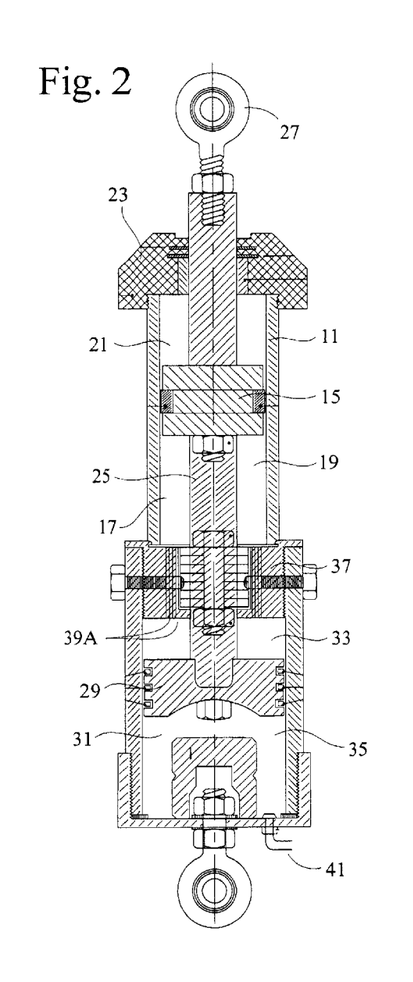
FIG. 2 is a cross-section schematic of a suspension unit according to a second embodiment of this invention.
Figure 3:
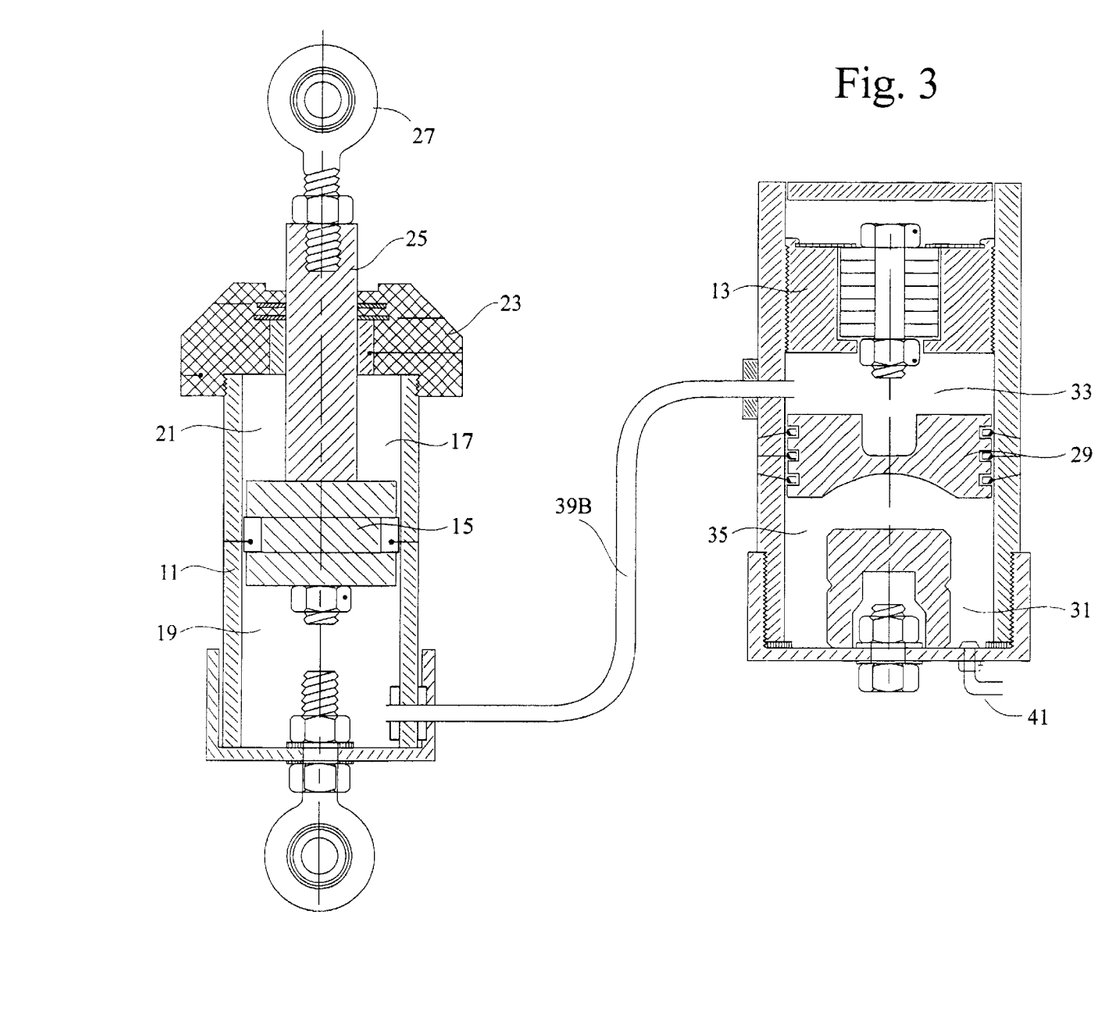
FIG. 3 is a cross-section schematic of a suspension unit according to a third embodiment of this invention.

In FIGS. 1, 2 and 3, different suspension units according to the invention comprise two housings 11 and 13. Each housing 11, 13 comprises a cylinder manufactured by machining a suitable part made of a metallic material, such as alloy steel SAE 1010.

The upper housing 11 contains a piston or plunger 15 slidably mounted in a chamber 17 therein. The upper housing 11 is closed by a top 23 which is hermetically traversed by a rod 25 provided with anchorage means 27 at an end thereof extending outside the housing 11 for affixing the piston 15 to a movable part requiring suspension, such as the chassis or body of an automobile (not shown) or a bicycle or motorcycle fork. The piston 15 divides the chamber into a hydraulic space 19 and an pneumatic space 21.

Figure 6:
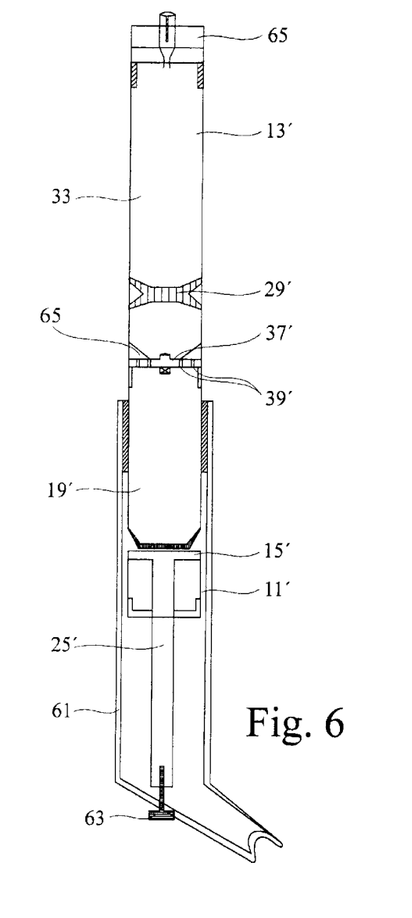
FIG. 6 is a cross-section schematic of bicycle or motorcycle fork having a suspension unit according to the invention mounted therein.
Figure 7:
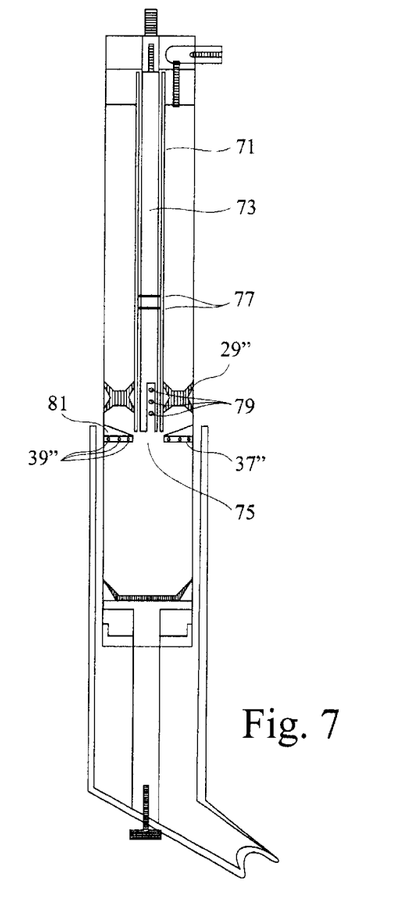
FIG. 7 is a cross-section schematic of a further embodiment of a suspension unit adapted for mounting in bicycle or motorcycle fork.
Figure 8:
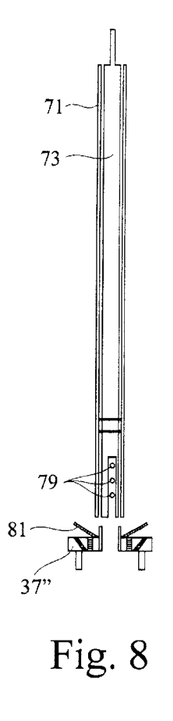
FIG. 8 is a magnified view of a part of FIG. 7 illustrating a selectively variable and assymetrical dampening system of the suspension unit.

Reference to "upper" and "lower" is simply for convenience in regard to these drawing figures; it being undertood that the suspension units may just as well be mounted upside-down, as show in FIGS. 6 to 8 described further on herein.

The lower housing 13 contains another piston 29 which divides a chamber 31 therein into a hydraulic space 33 and a pneumatic space 35. Commercial grade transmission oil may be used as the hydraulic fluid in the spaces 19 and 33. The pneumatic space 35 may be filled with a gas, e.g. nitrogen at a pressure of, e.g., about 750 psi (5.2 MPa). As apparent hereinafter, the piston 29 is actually a driven piston in the sense that during a forward stroke it will be displaced as a result of movement of the driver piston 15 affixed to the anchor 27. The underspace 35 forms a gas cushion on which the driven piston 29 rests and acts as a spring thereagainst. Either or both pistons 15 and 29 may be made from a synthetic material such as Teflon™.

Refering more particularly to FIGS. 1 and 2, the housings 11 and 13 are mounted in a common structure by means of a double threaded coupler 37 which, furthermore, separates the chambers 17 and 31. The coupler comprises a generally ring-shaped stopper 37 provided with threads screwing onto the bottom end of the upper housing 11 and into the top end of the lower housing 13. The hydraulic spaces 19 and 33 therein are communicated by orifices 39A for constrictive flow of oil from one space to the other. As known in the art, the orifices 39A are dimensioned in order to restrict the flow rate of oil as a function of fluid pressure to provide the desired dynamic dampening factor required of shock absorbers.

In FIG. 1, the driven piston is a floating piston 29. Each piston 15 and 29 is designed to have a normal placement in an intermediate position inside their respective chamber 17, 31. When the driver piston 15 is subjected to a dynamic load, say a compression, it pushes on the fluid in the space 19 forcing it through the orifices 39A, thereby increasing the pressure in the oil-filled space 33. The increased pressure acts on the floating piston 29 which is thus displaced until the compression of the gas cushion 35 increases enough to balance the pressure in the space 33. This is a dynamic process which proceeds until oil stops flowing through the orifices, that is when the internal pressures of spaces 19, 33 and 35 are matched, or until the external force acting on the anchor 27 ceases or diminishes sufficiently, whereafter the gas cushion 35 urges the floating piston 29 back to its normal placement, thereby reversing oil flow which creeps back through the orifices 39A and urges the driver piston 15, together with the vehicle part attached to the anchor 27, back to their normal placements. During extreme operation, the pressure of the fluids in the chambers 17 and 31 may be found to increase from their quiescent level of 750 psi up to as much as 4,300 psi (30 MPa).

FIG. 3 illustrates an alternative embodiment to FIG. 1 wherein the housings are formed by separate structures 11 and 13. This arrangement is preferred when vertical space is at a premium. The housing structures 11 and 13 may be mounted side-by-side in a vehicle, for instance. In this embodiment, the driver chamber 17 is fluid-coupled by a length of tubing 39B to the driven chamber 31. Operation of the unit of FIG. 3 is the same as described in relation to FIG. 1.

FIG. 2 represents a particularly preferred embodiment wherein the lower piston 29 is mechanically driven. The rod 25 extends centrally through the driver piston 15 and the stopper 37 and is affixed to the lower piston 29. Both pistons 15 and 29 are thus mechanically interconnected in tandem such that they move together when an external disturbance is transmitted via the anchor 27. The combined movement of the pistons is dynamically dampened by the oil flow through the constrictor orifices 39A and resiliently restricted by the gas cushion 35. Apart from these differences relative to the way energy is transmitted from one piston to the other, operation is otherwise generally similar, although testing has shown that rides appear to be smoother and road-surface adherence better with the suspension unit of FIG. 2.

Figure 4:
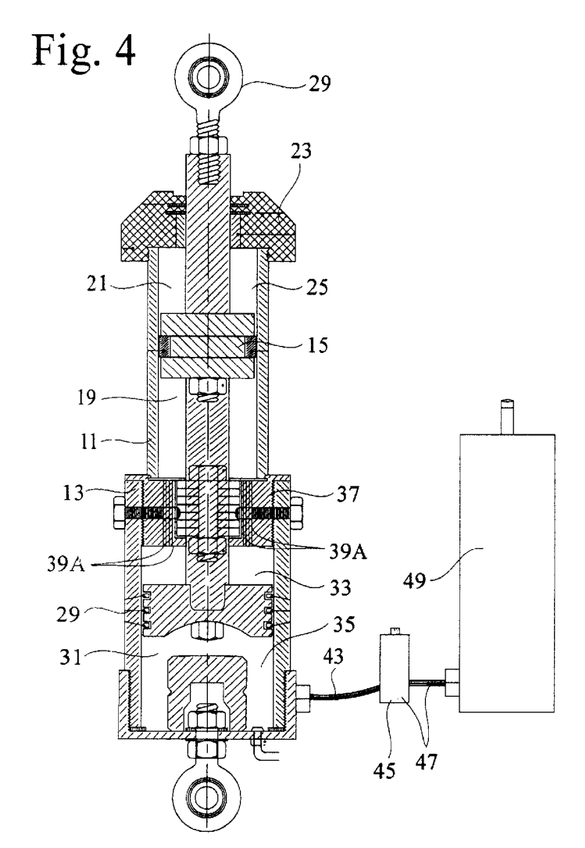
FIG. 4 is a cross-section schematic of a suspension unit having an accesory chamber applicable to either units of FIGS. 1, 2 or 3.

In FIGS. 1, 2 and 3, a precharger valve 41 traverses the housing 13 into the pneumatic space 35. The valve 41 may be used for injecting or extracting pressurized gas from the space 35, such as by means of a pump (not shown), to adjust the normal placements of the pistons 29 and 15 in their chambers 31 and 17, respectively, thereby compensating for vehicle load variations or custom fitting stiffer or softer suspensions to vehicles. Alternatively or additionally, the pneumatic space 35 may be coupled by flexible tubing 43 and 47 and a valve 45 (which may be the same one valve 41) to an external chamber 49 containing air pressurized at about 750 psi (5.2 MPa), as shown in FIG. 4. The valve 45 may be selectively opened and closed for providing different stiffness set values for the suspension unit.

Figure 5:
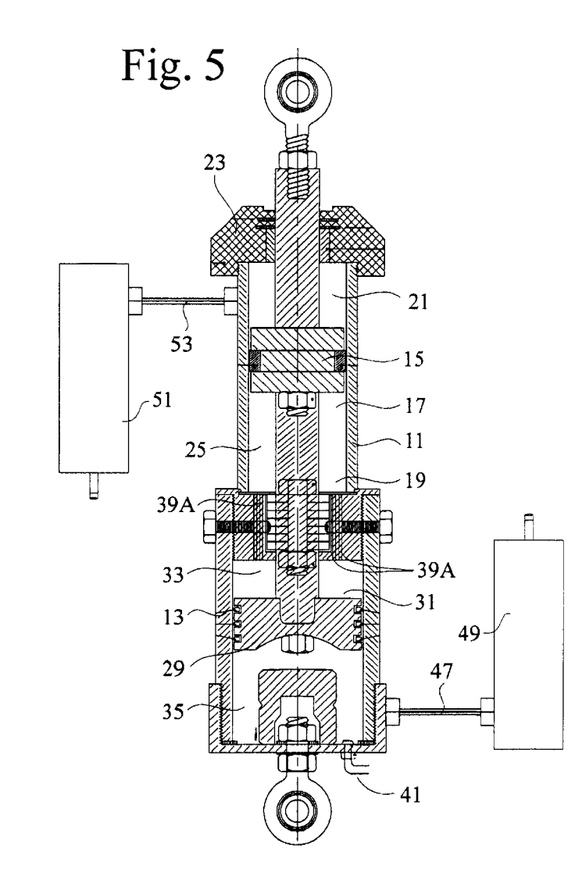
FIG. 5 is a cross-section schematic of a suspension unit showing an alternative embodiment for the suspension unit of FIG. 4.

FIG. 5 shows a further embodiment including a container 51 connected by a flexible tube 53 to the variable space 21 in the chamber 17 above the driver piston 15. The container holds pressurized gas and may be used for adjusting the placements of the piston assembly 15–29, such as for centering the expansion and compression strokes thereof.

FIGS. 1 to 5 described hereinabove generally implicitly referred to suspension units designed for automobile vehicles, such as motor-cars and heavy transport vehicles. Replacement of standard springs and shock absorbers by suspension units according to this invention may advantageously reduce the overall weight of vehicles. FIGS. 6 to 8 refer hereinbelow to suspension units applied to bicycle and motorcycle vehicles, operation of which is, in principle, akin to that described hereinabove. Like reference numerals suffixed by a quotation mark (') identify corresponding parts of the suspension units, thereby avoiding unnecessary repeating descriptions in full.

In FIG. 6, the suspension unit is mounted in a bicycle or motorcycle fork 61. A piston 15' in the lower housing 11' has a rod 25' which is anchored to the fork 61 a screw 63. The upper housing 13' is anchored to the handlebar 65 of the 'cycle and contains a double-lipped floating piston 29'.

A fixed separator wall 37' is traversed by ten limited orifices 39' for oil passage between the oil filled spaces 19' and 33'. A rubber-leaf valve 65 restricts flow through seven of the ten orifices 39' to one way, that is from the driver or lower space 19' to the upper or driven space 33'. Hence, inverse fluid flow is restricted to three orifices 39' for a more controlled expansion stroke.

In an alternative embodiment shown in FIG. 7, a tubular housing 71 extends centrally upwards and through a floating piston 29'' from a separator wall 37'' having a central orifice 75. The tubular housing 71 has an inner tube 73 rotably mounted therein, the bottom end of which is coupled to the driver oil-filled space 19'' by the orifice 75. A couple of rubber O-rings 77 maintain the inner tube 73 coaxially aligned within the tubular housing 71 and prevent oil in between both tubular members 71–73 from creeping further up.

As shown in FIG. 8, both tubular members 71–73 are provided with a set of three, for instances, small orifices 79 about 4 mm in diameter. The orifices 79 of one tubular member are in vertical registration with the corresponding orifices of the other, such that rotation of the tube 73 inside the housing 71 enables the oil flow rate to be varied between, say, equivalent orifice diameters of 1 mm and 4 mm, to alter the dampening factor of the suspension unit. The separator wall 37'' is traversed by ten orifices 39'' selectively covered by a rubber valve 81 which is urged against the wall 37'' during an expansion stroke, to effectively close the orifices 39'' and provide assymetrical dampening to the compression and expansion strokes.

Six different calibration levels may be selected this way, making the suspension unit of the invention particularly adaptable to mountain 'cycles and vehicles going over different rough terrains, more particularly for competiton 'cycles.

Although the present invention has been disclosed in detail in connection with preferred embodiments and specific applications of suspension units, different modifications in construction, materials, mounting, operation and applications may appear to those skilled in the art without departing from the purview of the claims appended hereto.

I claim:

1. A suspension unit for connection between two relatively-movable parts in a combined resiliently and shock-absorbing relationship, said unit comprising:

(a) a housing (11) defining a first chamber (17) therein and a housing (13) defining a second chamber (31) therein, at least one of said chamber housings being adapted for anchorage to a first one of said movable parts;

(b) a first piston (15) slidably mounted in said first chamber and defining a first space (19) in said first chamber adjacent to said first piston for a substantially uncompressible fluid, said first piston including means (27) for anchoring said piston to the second of said movable parts in order to be driven by relative movement between said movable parts;

(c) a second piston (29) slidably mounted in said second chamber and defining in said second chamber a second space (33) for the substantially uncompressible fluid adjacent to said second piston;

(d) substantially continually open restricted passage means FIGS. 1–2: 39A, FIG. 3: 39B) for communicating fluid back and forth between said first and second spaces in response to sliding movement of said first piston in said first chamber, whereby movement between said first and second parts causes said uncompressible fluid to substantially immediately flow from one said space to the other said space through said passage means, thereby dampening movement between said movable parts, and further causing displacement of said second piston in said second chamber; and (e) resilient means (35) for biasing said second piston means in an intermediate placement in said second chamber generally corresponding to a normal placement of said first piston in said first chamber, whereby following said displacement of said second piston said resilient means urges said second piston back to its placement in said second chamber, thereby increasing pressure in said uncompressible fluid and urging said first piston back to said normal placement in said first chamber, for generally maintaining a predetermined distance between said movable parts.

2. The unit of claim 1, wherein said resilient means includes a third space for a substantially compressible fluid in said second chamber across said second piston from said second space.

3. The unit of claim 2, wherein said second housing is provided with a valve for injecting or extracting compressible fluid into said third space, for adjusting the normal placements of said pistons to alter suspension response of said unit.

4. The unit of claim 2, wherein said first and second housings are affixed to one another forming a common structure wherein said first and second chambers are coaxially aligned and separated from each other by separation means.

5. The unit of claim 4, wherein said separation means comprises a stopper (37) traversed by said passage means.

6. The unit of claim 5, wherein said stopper removably joins an end of said first housing adjacent said first space to an end of said second housing adjacent said second space.

7. The unit of claim 1, wherein said second piston is a floating piston, whereby said displacement thereof is caused by fluid pressure increasing in said second space in response to an inflow of uncompressible fluid from said first space through said passage means.

8. The unit of claim 1, adapted for connecting a chassis of an automobile to an axle thereof.

9. The unit of claim 1, wherein said restricted passage means includes an assymetrical flow control valve means for differential compression and expansion dampening factors.

10. The unit of claim 2, further including a container and a valve for selectively coupling said third space to said container for altering suspension response of said unit.

11. The unit of claim 10, wherein said container is in a housing structure separate from said first and second housings.

12. The unit of claim 10, further including separate third and fourth chambers in fluid communication respectively with said third space and with a fourth, pneumatic space defined in said first chamber across from said first piston from said first space, for altering suspension response of said unit.

13. The unit of claim 2, wherein said first and second housings comprise separate structures and said passage means comprises tubing means extending therebetween.

14. The unit of claim 2, wherein said first and second housings are mounted side-by-side.

15. The unit of claim 4, wherein said second piston is mechanically connected to said first piston in order that said first and second pistons displace in mechanical tandem together.

16. The unit of claim 15, wherein said mechanical connection includes a rod extending through said first piston and having an end affixed to said second piston.

17. The unit of claim 16, wherein said rod has a second end affixed to said second piston and adapted for anchorage to said second moving part.

18. The unit of claim 12, wherein said anchorage to said first moving part comprises anchorage means affixed to a free end of said second housing.

19. The unit of claim 1, adapted for connecting the handlebar of a bicycle or motorcycle to the fork mounting the front wheel thereof.

20. The unit of claim 19, further including rotable means for selectively varying the flow section of said restricted passage means.

21. The unit of claim 20, wherein said rotable means include a pair of coaxially mounted inner and outer tubular members provided with orifices in selectible registration.

22. A suspension unit for connecting a wheel mounting part to a body part of a vehicle in a combined resiliently-supporting and shock-absorbing relationship, said unit comprising:

(a) a housing defining a first chamber therein and a housing defining a second chamber therein, at least one of said housing adapted for anchoring to a first one of said movable parts;

(b) a first piston slidably mounted in said first chamber and defining a first space in said first chamber adjacent to said first piston for a substantially uncompressible fluid, said first piston including means for anchoring said piston to the second of said movable parts in order to be driven by relative movement between said movable parts;

(c) a second piston slidably mounted in said second chamber and defining in said second chamber a second space for the substantially uncompressible fluid adjacent to said second piston and a third space for a substantially compressible fluid across said second piston from said second space, wherein said compressible fluid in said third space normally biases said second piston in an intermediate placement in said second chamber generally corresponding to a normal placement of said first piston in said first chamber;

(d) substantially continually open restricted passage means for communicating fluid back and forth between said first and second spaces in response to sliding movement of said first piston in said first chamber, whereby movement between said first and second parts substantially immediately causes said uncompressible fluid to flow from one said space to the other said space through said passage means, thereby dampening movement between said parts, and further causing substantially immediate displacement of said second piston in said second chamber, following said displacement, said compressible fluid in said third space urges said second piston back to its intermediate placement in said second chamber thereby urging said first piston back to said normal placement in said first chamber for generally maintaining a predetermined distance between said movable parts.

23. The unit of claim 22, wherein said third space is coupled to a valve for selectively precharging said compressible fluid in said third space.

24. The unit of claim 22, wherein said first and second housings are affixed to one another forming a common structure wherein said first and second chambers are coaxially aligned and separated from each other by separation means, wherein said separation means is traversed by a plurality of orifices defining said passage means and joins an end of said first housing adjacent to said first space to an end of said second housing adjacent to said second space.

25. The unit of claim 22, wherein said second piston is a floating piston, whereby said displacement thereof is caused by fluid pressure increasing in said second space in response to an inflow of uncompressible fluid from said first space through said passage means to said second space.

26. The unit of claim 24, further including rod means mechanically connecting said first piston to said second piston, said rod extending outside said housings and having an end thereoutside adapted for anchoring to said second moving part.

27. The unit of claim 25, wherein said first and second housings comprise separate structures and said passage means comprises tubing means extending therebetween.

28. The unit of claim 22, wherein said restricted passage means includes an assymetrical flow control rotary tubular valve means for selectively varying the flow section of said restricted passage means and providing differential compression and expansion dampening factors.

* * * * *

UNITED STATES PATENT AND TRADEMARK OFFICE
CERTIFICATE OF CORRECTION

PATENT NO.     : 6,311,961 B1
DATED          : November 6, 2001
INVENTOR(S)    : Silvestre E. Julia It is certified that error appears in the above-identified patent and that said Letters Patent is hereby corrected as shown below:

Column 7,
Line 15, immediately before "FIGS. 1-2" insert -- ( -- (parenthesis).

Signed and Sealed this

Tenth Day of June, 2003

JAMES E. ROGAN
*Director of the United States Patent and Trademark Office*